US007839302B2

(12) United States Patent
Staniszewski

(10) Patent No.: US 7,839,302 B2
(45) Date of Patent: Nov. 23, 2010

(54) VEHICLE PARKING ASSISTANCE ELECTRONIC TIMER SYSTEM AND METHOD

(76) Inventor: John T. Staniszewski, 378 Garretson Ave., Staten Island, NY (US) 10305

( * ) Notice: Subject to any disclaimer, the term of this patent is extended or adjusted under 35 U.S.C. 154(b) by 839 days.

(21) Appl. No.: 11/580,811

(22) Filed: Oct. 14, 2006

(65) Prior Publication Data

US 2007/0188349 A1 Aug. 16, 2007

(51) Int. Cl.
*B60Q 1/48* (2006.01)

(52) U.S. Cl. ............................... 340/932.2; 340/309.16

(58) Field of Classification Search ............. 340/932.2, 340/933, 539.1, 309.16, 309.7, 905, 5.9, 340/937; 235/384; 701/1, 209, 210; 705/13, 705/37

See application file for complete search history.

(56) References Cited

U.S. PATENT DOCUMENTS

| | | | | |
|---|---|---|---|---|
| 4,197,524 | A | 4/1980 | Salem | |
| 4,476,469 | A | 10/1984 | Lander | |
| 4,641,125 | A | 2/1987 | Pesa | |
| 4,879,553 | A | 11/1989 | Right | |
| 5,278,395 | A | 1/1994 | Benezet | |
| 5,438,555 | A | 8/1995 | Kim | |
| 5,442,348 | A | 8/1995 | Mushell | |
| 5,475,368 | A | 12/1995 | Collins | |
| 5,589,812 | A | 12/1996 | Jones | |
| 5,630,206 | A | 5/1997 | Urban et al. | |
| 5,642,095 | A | 6/1997 | Cook | |
| 5,691,932 | A | 11/1997 | Reiner et al. | |
| 5,705,977 | A | 1/1998 | Jones | |
| 5,926,090 | A | 7/1999 | Taylor et al. | |
| 5,982,520 | A | 11/1999 | Weiser et al. | |
| 6,060,980 | A | 5/2000 | Bedol | |
| 6,102,285 | A | 8/2000 | Elias | |
| 6,114,953 | A | 9/2000 | Martin | |
| 6,166,652 | A | 12/2000 | Benvenuti | |
| 6,188,311 | B1 | 2/2001 | Rothschild | |
| 6,191,682 | B1 | 2/2001 | Wolfgang | |
| 6,265,974 | B1 | 7/2001 | D'Angelo et al. | |
| 6,351,207 | B1 | 2/2002 | Mik et al. | |
| D458,017 | S | 6/2002 | Yehudai | |
| 6,400,358 | B1 | 6/2002 | Carter | |
| 6,526,335 | B1 | 2/2003 | Treyz et al. | |
| 7,181,426 | B2 * | 2/2007 | Dutta | 705/37 |
| 2002/0029164 | A1 * | 3/2002 | Sugar et al. | 705/13 |
| 2002/0044055 | A1 | 4/2002 | Maloney | |
| 2004/0068433 | A1 * | 4/2004 | Chatterjee et al. | 705/13 |

* cited by examiner

*Primary Examiner*—Van T. Trieu
(74) *Attorney, Agent, or Firm*—Barley Snyder LLC

(57) ABSTRACT

An electronic timer system includes a first unit. The first unit includes a memory device configured to store predetermined parking rule data, a timer device configured to determine at least one of a day, a date and a time of day, and an alert device configured to emit an alert in accordance with the predetermined parking rule data and based on at least one of the day, the date and the time of day determined by the timer device. A method includes storing predetermined parking rule data in a memory device, determining at least one of a day, a date and a time of day, and emitting an alert in accordance with the predetermined parking rule data stored in the storing step and at least one of the day, the date and the time of day determined in the determining step.

12 Claims, 13 Drawing Sheets

VEHICLE PARKING ASSISTANCE ELECTRONIC TIMER SYSTEM AND METHOD

CROSS-REFERENCE TO RELATED APPLICATIONS

The present application claims the benefit of U.S. non-provisional patent application Ser. No. 11/352,677 filed Feb. 13, 2006 now U.S. Pat. No. 7,123,167 which is expressly incorporated herein in its entirety by reference thereto which, in turn, claimed the benefit U.S. non-provisional patent application Ser. No. 10/678,195 filed Oct. 2, 2003 now U.S. Pat. No. 7,023,360 which was expressly incorporated therein in its entirety by reference thereto which, in turn, claimed the benefit of U.S. provisional Patent Application No. 60/416,555, filed on Oct. 7, 2002, which was expressly incorporated therein in its entirety by reference thereto. The present application is related to Disclosure Documents Nos. 517,091, 517,466, 519,560 and 534,245, filed in the United States Patent and Trademark Office, each of which is expressly incorporated herein in its entirety by reference thereto.

FIELD OF THE INVENTION

The present invention relates to an electronic timer system and method.

BACKGROUND INFORMATION

Owning and operating a motor vehicle may be expensive, and with the cost of parking tickets and other avoidable fines and citations, the cost may be significantly increased. Drivers often have to remember an increasing number of periodically changing and special driving and parking regulations in order to avoid violating any vehicle-related ordinances. Lack of timely, updated information or reminders regarding the appropriate regulations may be a problem for some drivers who are already juggling many other responsibilities.

U.S. Pat. No. 4,641,125 is believed to describe a meter beater timer that alerts the user when a predetermined time interval has expired. The user is reminded to set the timer when he withdraws the key from the ignition, by a key chain attachment that retracts into a timer housing when the key is removed, thereby depressing a plunger, which sets off an alarm.

U.S. Pat. No. 5,438,555 is believed to describe a multi-purpose key ring including a pouch to hold coins and a timer that may be set to select one of a choice of time periods, at the end of which a signal sounds.

U.S. Pat. No. 6,114,953 is believed to describe an automotive accessory reminder device for vehicle key rings including an integrated processor programmable to provide reminder information in a variety of operating modes including, mileage, date, parking location, parking meter expiration, event status and lost key recovery assist.

U.S. Pat. No. 6,400,358 is believed to describe a portable electronic parking location reminder device that may be carried on a key chain or key ring, including an electronic display screen and a battery powered micro-controller with memory and timer features.

U.S. Published Patent Application No. 2002/0044055 is believed to describe an object carrier for an object control and tracking system including a storage receptacle for receiving ID tags bearing touch memory devices and a computer based controller that detects the absence or presence and the identity of ID tags in the storage receptacle.

SUMMARY

According to an example embodiment of the present invention, an electronic timer device and an associated base unit may be programmed to remind the owner of a car of day(s) and/or time(s) that parking restrictions are in effect, for example, alternate side of the street parking restrictions. The electronic timer device may store predetermined information regarding the street name, locations, days and hours that parking is permitted or restricted based on municipal or other regulations, rules, and/or ordinances. By comparing this predetermined information to the present time and date, the electronic timer device may remind the user when and where to park his or her vehicle.

The electronic timer device may also remind the car owner that parking meter time is about to expire, and/or to alert the owner of other events, e.g., scheduled maintenance, oil change, annual inspection, registration renewal, etc. or general date/time entries. The electronic timer device may also provide for additional data storage, e.g., address and telephone directory. The alert may be made by sound, vibration and/or visual indication. A display, which may be illuminated, may be provided to display time, day, date, etc. The electronic timer device may be set to alert the owner at a predetermined time before the event, e.g., 0, 5, 10, and/or 15 minutes before expiration of parking meter time. Access to alerts and other functionality may be restricted by password access. The electronic timer device may also include slots for holding coins.

A honing device may be provided so that activation of the base unit may cause the electronic timer device to provide an alert to aid in finding lost keys or other articles attached to the electronic timer device. Rechargeable batteries may be provided in the electronic timer device with a recharger unit located in the base unit. The electronic timer device may provide an alert when battery charge is nearly depleted and as a reminder to recharge the battery. The memory of electronic timer device may be non-volatile to prevent data loss.

The electronic timer device may be provided with a sound/signal device so that if the owner locks the electronic timer device in the car, the owner can tap on the car window in a programmable sequence to unlock the car door.

The electronic timer device may be connectable to a computer via a swing-out, pop-up, retractable, etc. connector (e.g., for connection to a USB device). Additional memory may be provided in the electronic timer device for transportation of data files.

The base unit may facilitate use of the electronic timer device, for example, by storing and charging the electronic timer device when it is not in use, or updating information stored in the electronic timer device. The base unit may also be used independently, as it is designed to perform all of the same functions as the electronic timer device, as well as additional functions, including, for example, an alarm clock function.

According to an exemplary embodiment of the present invention, the electronic timer device may have a changeable rectangular housing with several attachments, such as a key holder, a hinged arm with a connection device, a light emitting device, a chargeable connection, a car adapter slot, a hinged flap. A processor device, a wireless connection device, and a thermometer device may be housed in the housing.

According to another exemplary embodiment of the present invention, the electronic timer device may have a housing including a hinged cover, which may be opened to provide access to a display window and keypad. The keypad may include timer buttons, alarm selection buttons, mode selection buttons, clock buttons, count buttons, sound buttons, vibrate buttons, strobe buttons, and flash light buttons.

According to another exemplary embodiment of the present invention, the electronic timer device may have calculator type buttons, a display, a sliding cover with windows, security code entry buttons, a camera, a speaker, a radio tuner, and a headset attachment.

According to another exemplary embodiment of the present invention, the electronic timer device may have an outer housing into which an inner housing is arranged so that it may slide into and out of the outer housing. The outer housing may include windows so that various components of inner housing may still be exposed when the inner housing has been inserted into outer housing. A rechargeable battery and an interface may also be included.

According to another exemplary embodiment of the present invention, the electronic timer device may operate several menu display sequences stored in a memory device regarding information, such as parking and parking meter information, alarm information, oil change information, inspection date information, additional reminder information, honing device controls, phone bank information, calendar setting information, alarm setting information and external device connection information. The memory device may store, e.g., scheduling information, e.g., a garbage pick-up schedule, a mail or other delivery schedule, other regularly set schedules, etc. The memory device may store credit and/or debit card information and may be usable in replace of credit and/or debit cards.

The electronic timer device may include a projection device for projecting information onto a surface. For example, the electronic timer device may include a projection light configured to project, e.g., time, date, alarm selections, etc., onto a wall.

According to another exemplary embodiment of the present invention, the electronic timer device may have a housing that includes one or more quarter slots, a battery, a charging port, a memory card, and an external device connector. The electronic timer device may be in the form of, e.g., a watch, and/or may be integrated into, e.g., a watch.

According to another exemplary embodiment of the present invention, the electronic timer device may include an electronic timer device base unit, which may be programmed simultaneously with the electronic timer device, or at a late time. The base unit may perform the same functions as the electronic timer device, and may be programmed in the same manner as the electronic timer device. Therefore, the same data entry options and menu sequences may be accessed using the base unit that may be accessed using the electronic timer device. This data may be entered into both the electronic timer device and the base unit at once, when the devices are coupled, or they may be periodically synchronized, automatically, or when the user initializes a synchronization. The base unit may communicate with other accessories to the system.

According to another exemplary embodiment of the present invention, the electronic timer device may include a housing formed with two sections connected by, for example, a friction: hinge, such that a bottom section may lay flat and support a top section, which may be positioned upright. The electronic timer device may also include a display surface with virtual or touch screen buttons, light emitting devices, speaker, menu buttons and menu arrows, a meter set button, an alarm off button, and an alarm demo button.

According to another exemplary embodiment of the present invention, the electronic timer device may include a scrolling electronic display, which scrolls menu information and messages and a rows of buttons used for entering information.

The electronic timer device and/or the base unit may include, e.g., temperature functions, weather functions, a compass, AM and/or FM radio receivers, a compact disc player, a record player, other device(s) for recording and/or playing voice, music, video, computer files, a game, snooze alarm capabilities, a sensory alarms, e.g., aroma, olfactory, vibration, sound, (i.e., seeing, hearing, tasting, touching, and/or smelling), gradually increasing and/or decreasing light and sound abilities. The electronic timer device and/or base unit may be connectable to a home compute and/or a remote system, e.g., an alarms, light controls, appliances, etc. The electronic timer device and/or remote unit may be connectable to a vehicle systems, e.g., an alarm, start-up, heat, radio, TV/video, other remote devices, etc. The electronic timer device and/or base unit may include sport watch capabilities, health capabilities, e.g., pulse rate, distance measurement, caloric counter, blood pressure, medicine reminder, etc. and stopwatch features. The electronic timer device and/or the base unit may include 12/24 hour military time selection, a world time zone selector for world and travel use, memory chip and/or computer functions and hook up for, e.g., Internet, wireless, etc. communication. The electronic timer device and/or the base unit may be operable by voice control, may include camera, video and/or audio record, storage, playback capabilities. The electronic timer device and/or the base unit may include cell phone, messaging, live video, conferencing and/or wireless capabilities. The electronic timer device and/or the base unit may be connectable to systems, such as a monitoring or assistance service {e.g., ONSTAR®-, LOJACK®-, etc.), a map system or service, a research system or service, a computer device, telephone lines and/or devices, etc. The electronic timer device and/or base unit may include a dictionary, a thesaurus, a language translator, a calculator, etc.

According to an example embodiment of the present invention, an electronic timer system includes a first unit, the first unit having a memory device configured to store predetermined parking rule data, a timer device configured to determine at least one of a day, a date and a time of day and an alert device configured to emit an alert in accordance with the predetermined parking rule data and based on at least one of the day, the date and the time of day determined by the timer device.

The predetermined parking rule data may include data representing municipal parking regulations.

The predetermined parking rule data may include data representing on-street parking regulations.

The predetermined parking data may include at least one of day, date and time data.

The memory may be configured to store data relating to at least one of vehicle maintenance, an address, a telephone number, an appointment and a calendar entry.

The electronic timer system may include a user interface, and the user interface may be configured to process a security code to activate the first unit.

The alert device may be configured to be automatically activated at least one predetermined time interval before a time indicated by the predetermined parking rule data.

The electronic timer system may include a rechargeable battery adapted to provide electrical power to the first unit.

The electronic timer system may include a connection device configured to logically couple the first unit to an external device.

A surface of the first unit includes at least one indented area configured to hold at least one coin.

The electronic timer system may include a sound-activated device configured to be coupled to a vehicle door locking and unlocking mechanism and configured to be activated by a predetermined sound pattern occurring in a vicinity of the sound activated device to operate the vehicle door locking and unlocking mechanism.

The electronic timer system may include a second unit remote from the first unit, and the second unit may include a communication device configured to at least one of transmit and receive a signal between the first unit and the second unit.

The electronic timer system may include a second unit remote from the first unit, and the second unit may be electrically and logically coupleable with the first unit.

The electronic timer system may include a position location device configured to determine a parking location of a vehicle and an arrangement configured to determine the predetermined parking rule data in accordance with the parking location determined by the position location device.

In accordance with an example embodiment of the present invention, an electronic timer system includes a first unit, the first unit having memory means for storing predetermined parking rule data, timing means for determining at least one of a day, a date and a time of day, and alerting means for emitting an alert in accordance with the predetermined parking rule data and based on at least one of the day, the date and the time of day determined by the timing means.

In accordance with an example embodiment of the present invention, a method includes storing predetermined parking rule data in a memory device, determining at least one of a day, a date and a time of day, and emitting an alert in accordance with the predetermined parking rule data stored in the storing step and the at least one of the day, the date and the time of day determined in the determining step.

The method may include determining a parking location of a vehicle, and determining the predetermined parking rule data in accordance with the parking location of the vehicle determined in the determining step.

In accordance with an-example embodiment of the present invention, an electronic device may include an alert device configured to emit an alert in accordance with predetermined parking rule data and based on at least one of a current day, a current date and a current time of day determined by a timer device.

In accordance with an example embodiment of the present invention, a method may include emitting an alert in accordance with predetermined parking rule data and in accordance with at least one of a current day, a current date and a current time of day.

It should be understood that the electronic device may be a separate unit or may be a general purpose computer, e.g., a desktop computer, a laptop computer, a hand-held computer, a PDA, a cordless telephone, a wireless telephone, a television, other electronic device, etc. Furthermore, any combination of electronic components, hardware and/or software may be arranged as the electronic timer device and/or arranged to perform the method. For example, software may be provided to be downloaded and/or input into any electronic device so that the electronic device is operable as the electronic timer device and/or to perform the method.

DETAILED DESCRIPTION

Figure 1A:
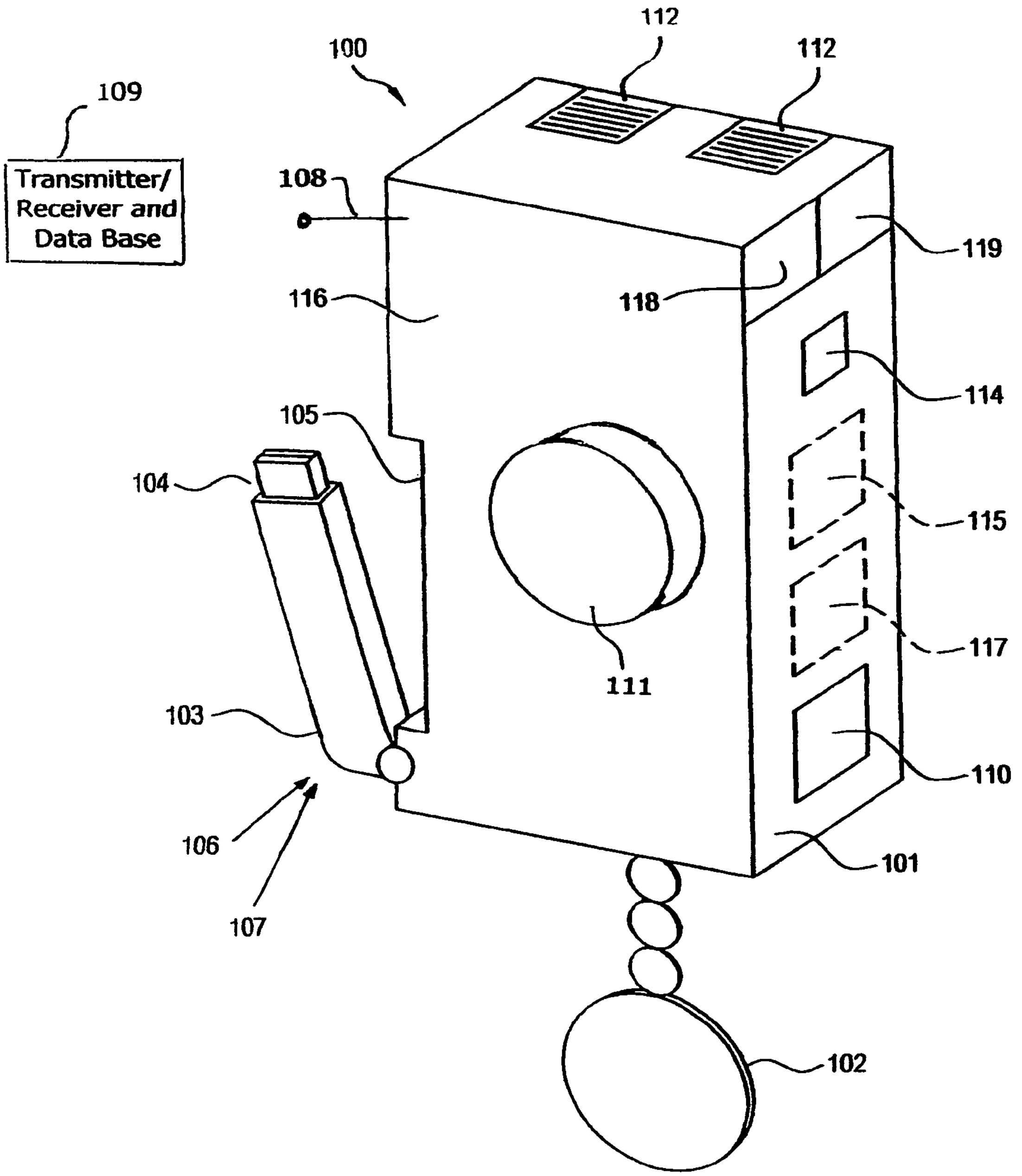
FIG. 1A shows an exemplary embodiment of an electronic timer device.

An exemplary embodiment of an electronic timer device 100 is shown in FIG. 1A. The housing 101 of the electronic timer device 100 may be formed of a durable and/or waterproof material, such as plastic or metal, so that it may withstand being accidentally dropped or stepped on, and protect the internal components from the environment, for example, rain. The housing 101 may be formed from any material that may be constructed, for example, molded or extruded, to form such a covering. The housing 101 may be in the-shape of, for example, a rectangle similar in dimension to a credit card. The housing 101 may be formed so that it is, for example, one half of an inch to one inch thick. Other shapes are possible, and the housing 101 may be formed into any shape that will allow for the inclusion of the other features of the electronic timer device 100. The housing 101 may be changeable, so that the user may select from housings of different colors and artistic designs in order to coordinate with a color scheme or theme. The housing 101 may be shaped in a practical form, such as stopwatch shape or wristwatch shape, with associated straps and/or cords. The housing 101 may be shaped in a whimsical form, such as, the shape of a sports car or in the likeness of an imaginary human meter attendant.

The electronic timer device 100 may include several attachments. The exemplary embodiment of FIG. 1A shows a key holder 102 which may be attached to the housing 101 of the electronic timer device 100 so that it may be easily attached to keys, other key-chains, wallets or purse attachments, etc. Other structures configured to hold a key may also be used as key holder 102, such as hook or loop with a hinged, screw, or magnetic type of opening.

FIG. 1A also shows hinged arm 103, which may include, a connection device 104, for example, a USB port attachment. One or more connection device(s) 104 may be connected to one or more hinged arm(s) 103. Hinged arm 103 may be designed to lie in an indentation 105 formed in housing 101 when not in use, such that, for example, in a closed position, its outer edge lies flush with the side of the housing 101. Hinged arm 103 may be rotated outward such that the connection device 104 is exposed and may be used in an open position. One of the connection device(s) 104 may be used to connect the electronic timer device 100 to a computer, or other remote system. One of the connection device(s) 104 may be used to connect the electronic timer device 100 to a standard phone line. One of the connection device(s) 104 may be used to connect the electronic timer device 100 to one or more devices 106 installed in a home or place of business that control functions within the building, such as an alarm, or a light control, air conditioning controller, or other appliance. One of the connection device {s) 104 may be used to connect the electronic timer device 100 to vehicle systems 107, such as, alarms, engine start up devices or other vehicle system start up devices (e.g., heat or A/C), radios, TV/video arrangements, garage door openers, and/or other remote systems.

FIG. 1A also shows light emitting device 110, which may act as a flash light and/or flash-blinking beacon or strobe in accordance with an alarm or reminder, when selected. Light emitting device 110 may have gradually increasing/decreasing light capabilities.

Chargeable connections 112 may also be included in housing 101, where the electronic timer device 100 may be connected in a chargeable fashion to the base unit described below. A car adapter slot 114 may also be included in housing 101, where the electronic timer device 100 may be coupled to an electronic power source in a vehicle, such as the cigarette lighter with an extension cord attachment, or any other available power source.

FIG. 1A also shows a hinged flap 116, which may be lifted to expose other features of the electronic timer device 100.

A memory device 115, for example, a RAM, and a processor device 117, which is capable of performing computer functions, such as running software programs, may be housed within housing 101. Processor device 117 may include memory device 115. The processor device 117 may be programmed to remind the owner of a car of day(s) and/or time(s) that parking restrictions are in effect, for example, alternate side of the street parking restrictions. The electronic timer device 100 may store predetermined information regarding the street name, locations, days and hours that parking is permitted or restricted, and types of vehicles that are permitted or prohibited from parking (e.g., trucks, taxis), based on municipal, private or other regulations, rules, and/or ordinances. By comparing/this predetermined information to the present time and date, the electronic timer device 100 may remind the user when and/or where to park his or her vehicle. The information may include, e.g., time-related information, day-related information, date-related information, location-related information, city-related information, state-related information, county-related information, locality-related information, municipality-related information, a combination thereof, etc.

The electronic timer device 100 may be connectable to a remote service, i.e., remote relative to the electronic timer device 100, to receive data relating to predetermined parking rules. This connection may include, e.g., a wireless connection, a radio connection, a wired communication, a telephone communication, a computer network communication, a satellite communication, etc. Via the connection, data relating to existing parking rules, data relating to revised parking rules, revised data relating to existing parking rules, data relating to suspension of parking rules, etc. may be transmitted to the electronic timer device 100.

A wireless connection device 118 may also be housed within housing 101, enabling the electronic timing device 100 to have Internet or wireless communication capabilities. Therefore, the electronic timer device 100 may function as a cell phone, and/or be equipped with voice control programming. Furthermore, navigation system and/or software, GPS system and/or software, and/or compass and directional capabilities may be provided. The electronic timer device 100 may be programmed and/or configured to determine location by the GPS or other location system and to determine, e.g., directly and/or in communication with a remote service or system, parking rules and/or regulations in effect at the location of the vehicle based on position determination made in accordance with the GPS system or other location system. The electronic timer device 100 may include the GPS device or other location system, an interface to an external GPS device or other location system, mapping software and data, etc. Using memory device 115 and processor device 117, databases may be stored in the electronic timer device 100, such as dictionaries, thesauruses, language translators, or various types of calculators. Furthermore, weather information, which may be periodically updated using the wireless or Internet connections, may be provided, as well as temperature recordings, using for example, a thermometer device 119 provided within the housing.

Figure 1B:
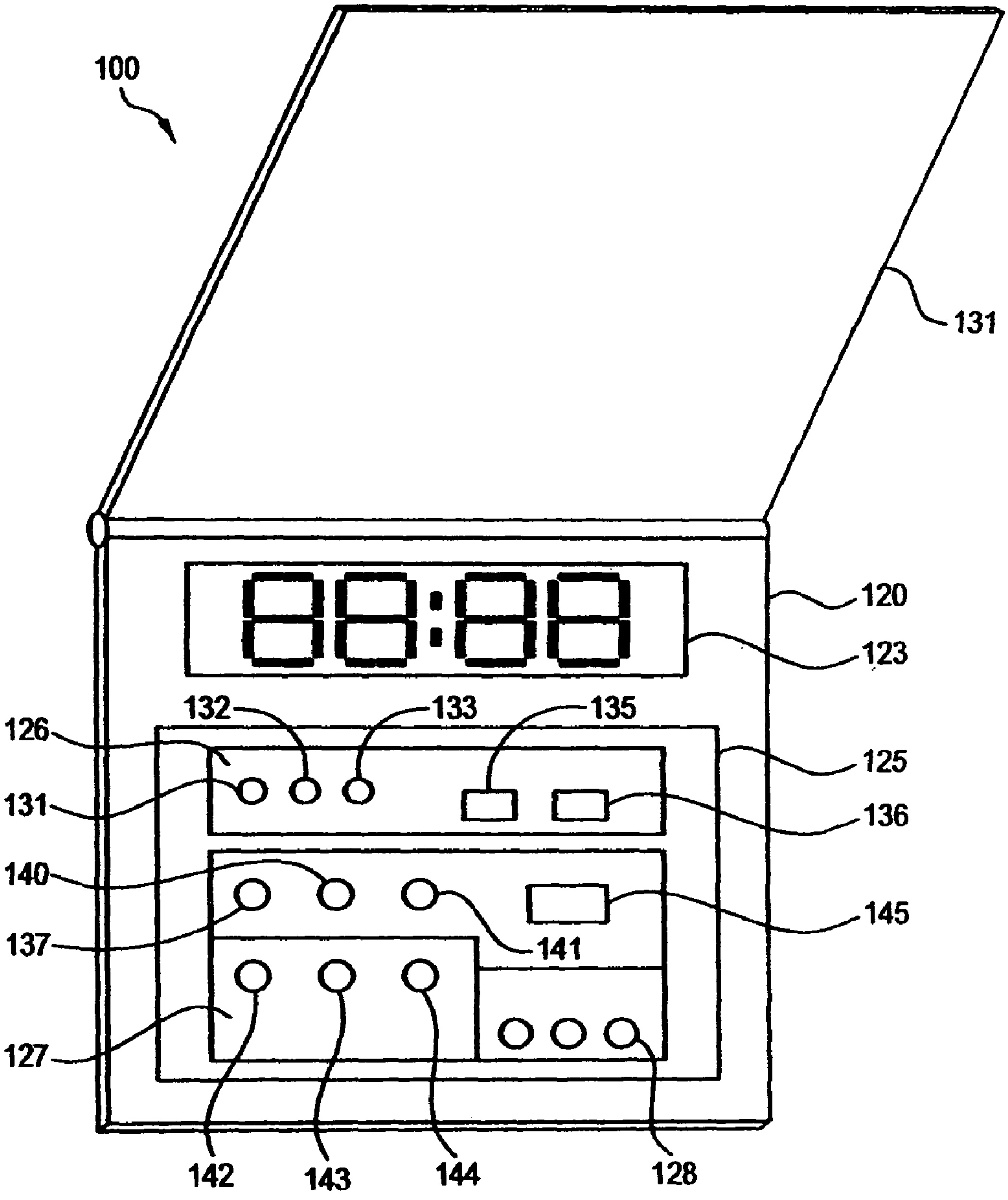
FIG. 1B shows another exemplary embodiment of an electronic timer device.

FIG. 1B shows an exemplary embodiment of an electronic timer device 100 where the housing 120 includes a hinged cover 131 which may be opened to provide access to a display window 123 and keypad 125. The keypad 125 may include timer buttons 126, alarm selection buttons 127, and mode buttons 128. Timer buttons 126 may include, for example, an hour set button 131, a ten minute set button 132, and a one minute set button 133. Therefore, for example, pressing the hour set button 131 once may change the displayed hour setting by one hour increments, and pressing the ten minute set button 132 may change the displayed minute setting by ten minute increments, etc. Other increments of time may be used, for example, fifteen minute increments, or thirty second increments. Timer buttons 126 may also include a meter button 135, which may be used to toggle between types or settings of meters and a time/date button 136, which may toggle between setting the time and date settings.

FIG. 1B also shows alarm selection buttons 127, which may be used to select which of several alarms is activated in accordance with a timer. For example, alarm selection buttons 127 may include a single toggle button or several buttons to activate a sound or sounds, a vibration, or a light or flashing light in accordance with the time set. A button or buttons to adjust the loudness or pattern of the sound, or the duration or pattern of the light or flashing of the light may be included. The light may also be selected as a flashlight to illuminate the keys in poor lighting or darkness.

FIG. 1B also shows mode selection buttons 128, which may be used to change the display to a desired mode. Mode selection buttons 128 may include several buttons where each button is configured to cause a particular mode to be displayed, or only one button which is configured to toggle between modes each time it is pressed. Modes may be preset or user defined. For example, available modes may include, for example, clock mode, in which the current time may be set or displayed, parking mode, in which parking rules may be set, and/or timer mode, in which time may be counted up or down. Additionally, available modes may also include a certain collection of settings by a particular that may be stored, for example under the user's name or nickname, or by a number code, and accessed using the mode buttons.

Therefore, according to FIG. 1B, a mode may be selected using the mode selection buttons 128, for example, a stopwatch mode. In accordance with the selected mode, a time, such as 5:50 p.m., or a duration of time, such as ninety minutes, or a start time and finish time may be entered, using the meter timer buttons. At the expiration of the time entered, or when a certain time is reached on the clock, an alarm device is activated, causing a sound, vibration, or light pattern to occur.

FIG. 1B shows a clock button 137 that may be used to select between clock settings. Clock settings may be include settings to show the time in standard format, or military format.

A world time zone selector may be a part of the clock settings, allowing time in different time zones to be displayed.

FIG. 1B also shows a timer setting button 140 that may be used to select between timer settings, a count button 141 to allow a time to be set and counted down, a sound button 142 that may be used to select between sound settings, a vibrate button 143 that may be used to select between vibration settings, and a strobe button 144 that may be used to select between strobe settings. Additionally, a flash light button 145 is shown that may be used to select between an on and an off setting of a light emitting device.

Figure 1C:
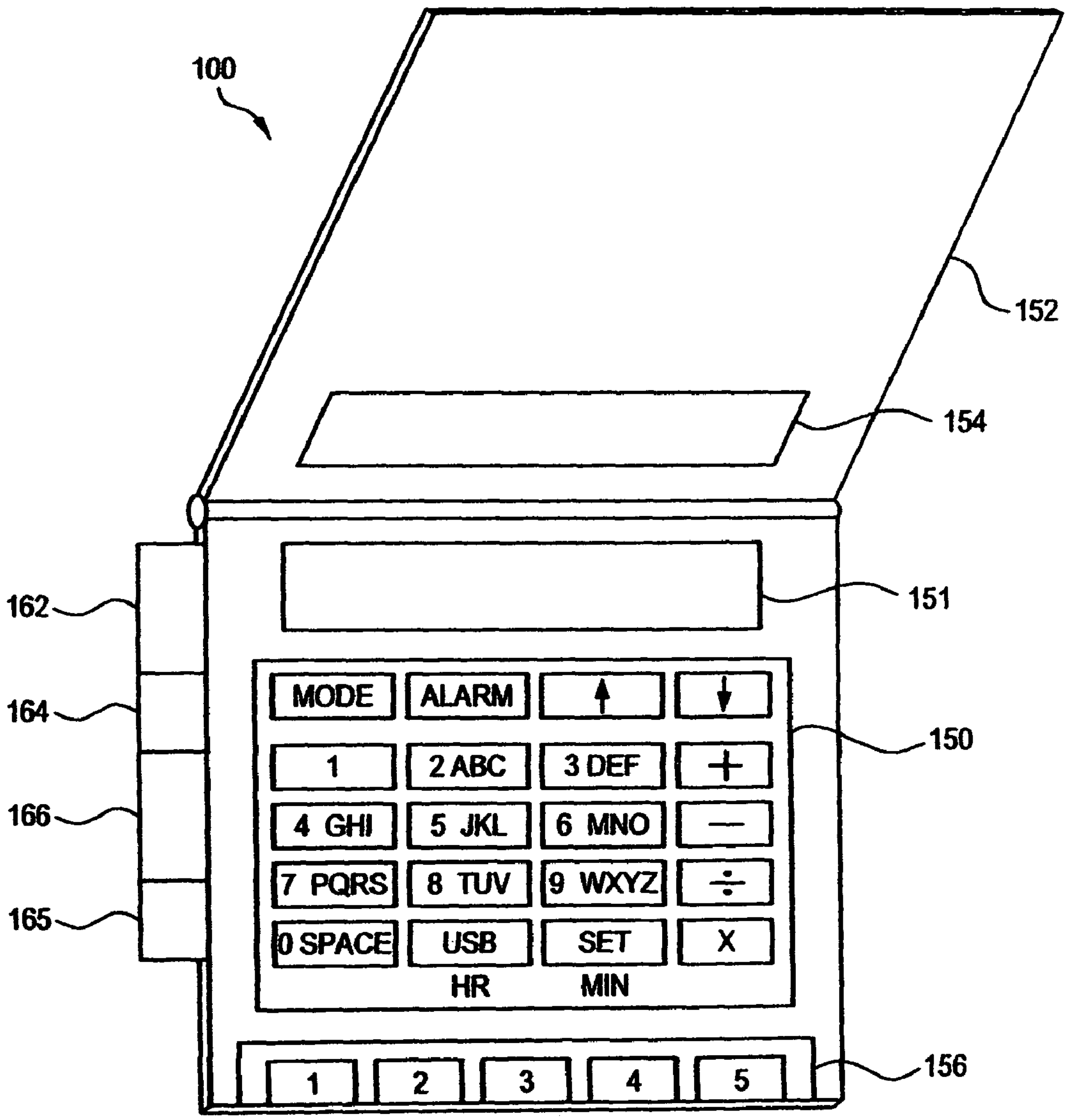
FIG. 1C shows another exemplary embodiment of an electronic timer device.

FIG. 1C shows another exemplary embodiment of the electronic timer device 100. This exemplary embodiment includes calculator type buttons 150 arranged in the vicinity of display 151. Additionally, timer, alarm, and mode buttons may be incorporated into the calculator type buttons as shown, or may be separately included in addition to the calculator type buttons.

FIG. 1C shows cover 152, which may be secured to protect the underlying elements from wear and tear. Cover 152 may be, for example, a hinged cover or a sliding cover, and may be made of any suitable material, for example, plastic or rubber, which is clear or opaque and may include designs according to the user's preference. The cover may include several windows 154 or slots such that a portion of the buttons 150, or one or more security code entry buttons 156, are accessible even when the cover is closed. The cover may lock when closed in a manner that requires the user to type in a security code in order to activate a cover lock release. This code may be known only to the user, and may be changed by the user when desired, thereby provide security to prevent unauthorized users from using the electronic timer device 100.

FIG. 1C also shows display area 151, which may be made to display numerical information, other types of data. Camera 162 may be used to capture digital pictures or video feed, which may be stored and later played back through display 151. Speaker 164 may be used in combination with the video capabilities to allow video conferencing. Radio tuner 166 may be provided to allow for radio stations to be played through speaker 164. Headset attachments 165 may also be provided. Music files may also be stored and played through speaker 164. Therefore, the electronic timer device 100 may be used to play computer games, which are stored or to which the electronic timer device 100 is connected through a wireless or telephone line connection.

Figure 2A:
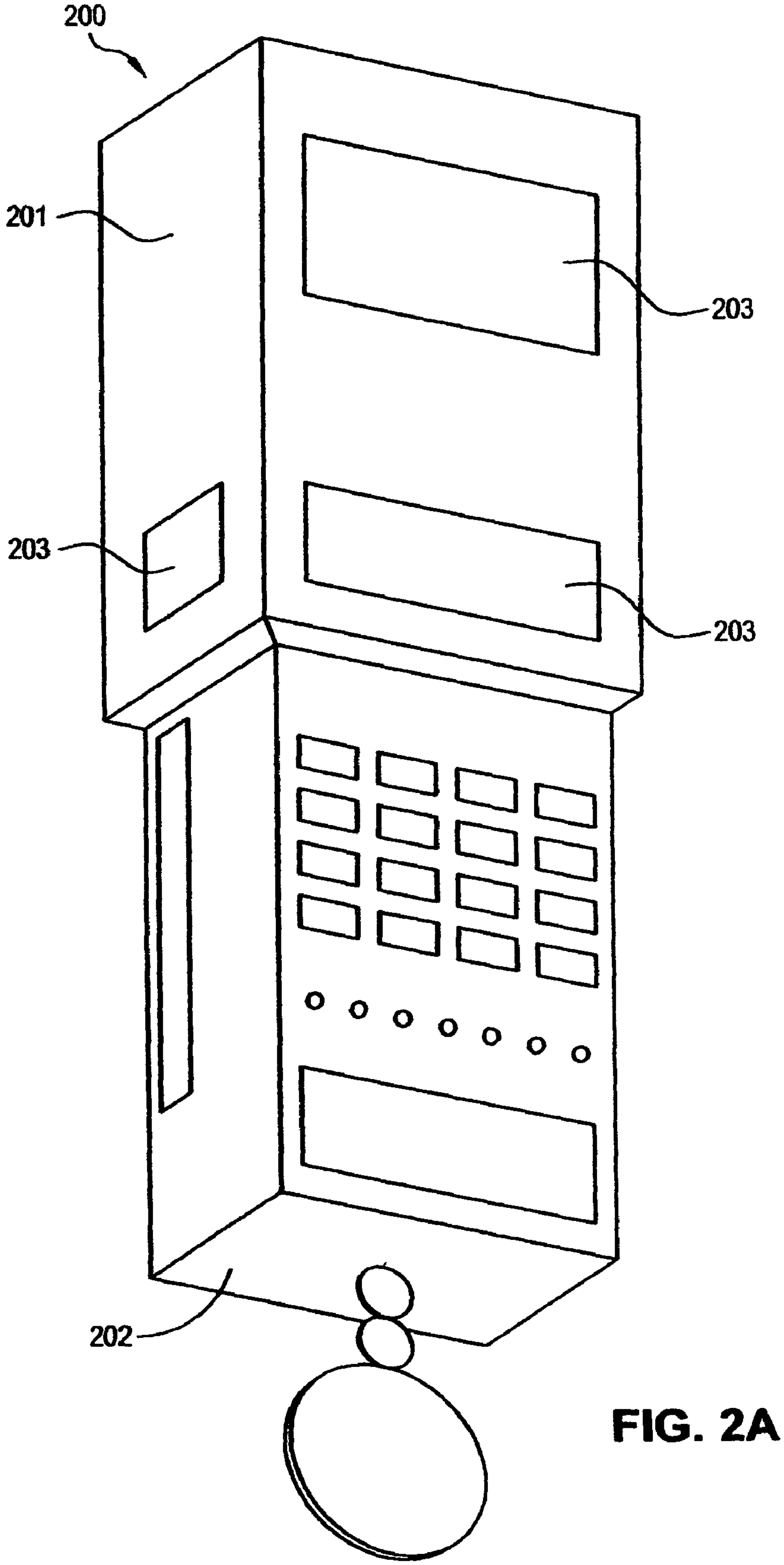
FIG. 2A shows a front view of another exemplary embodiment of electronic timer device.

FIG. 2A shows the front of another exemplary embodiment of electronic timer device 200, including an outer housing 201, which has been formed into a rectangular compartment into which an inner housing 202 is arranged so that it may slide into and out of outer housing 201. Outer housing 201 may include windows and cutouts 203 so that various components of inner housing 202, such as the light emitting device, may still be exposed when the inner housing 202 has been inserted into outer housing 201 in a closed position. As illustrated in FIG. 2A, the electronic timer device 200 includes a key ring. In place of the key ring, or in addition thereto, the electronic timer device 200 may include other attachment device(s), e.g., a clip, etc.

Figure 2B:
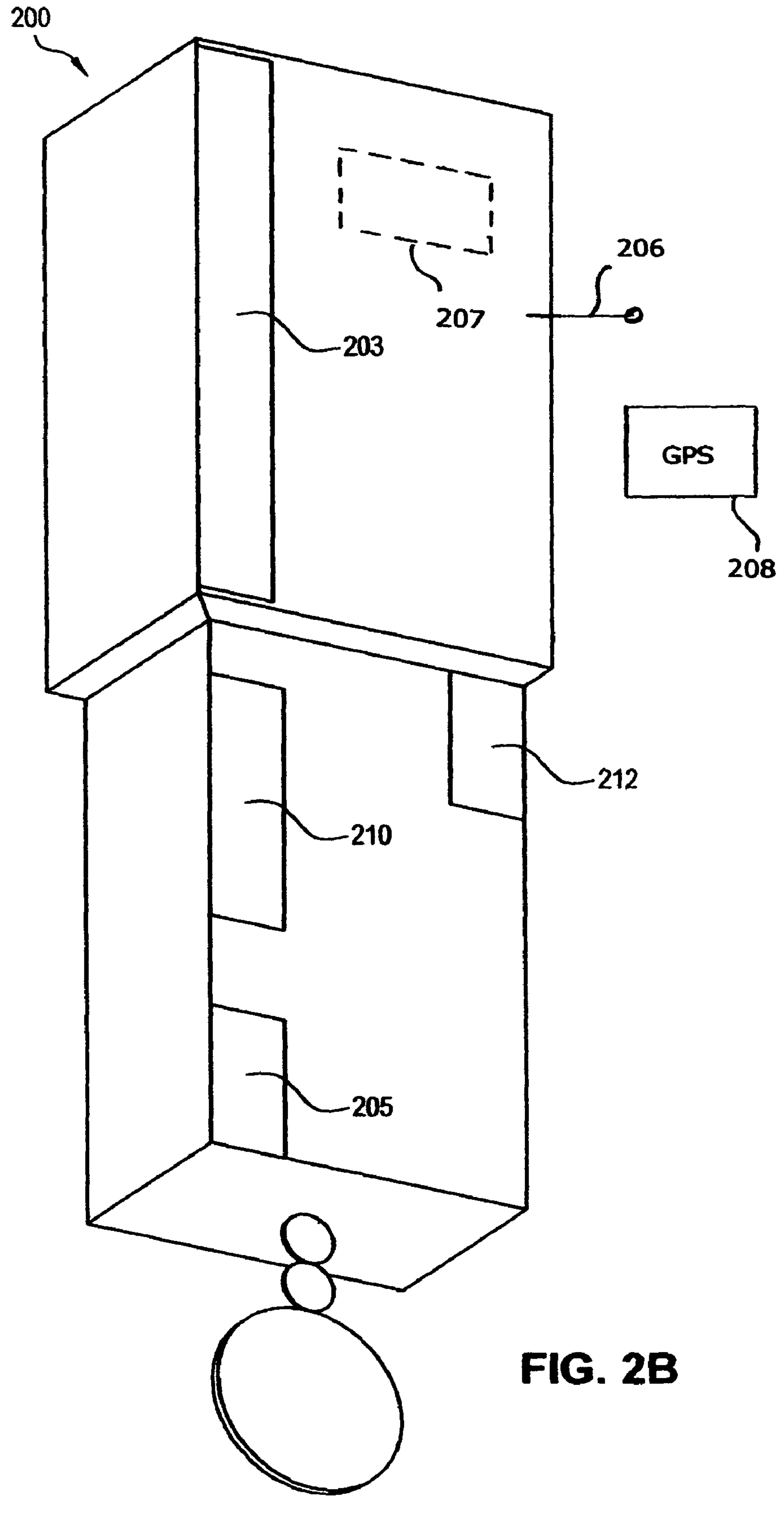
FIG. 2B shows a back of the exemplary embodiment of electronic timer device shown in FIG. 2A.
Figure 3A:
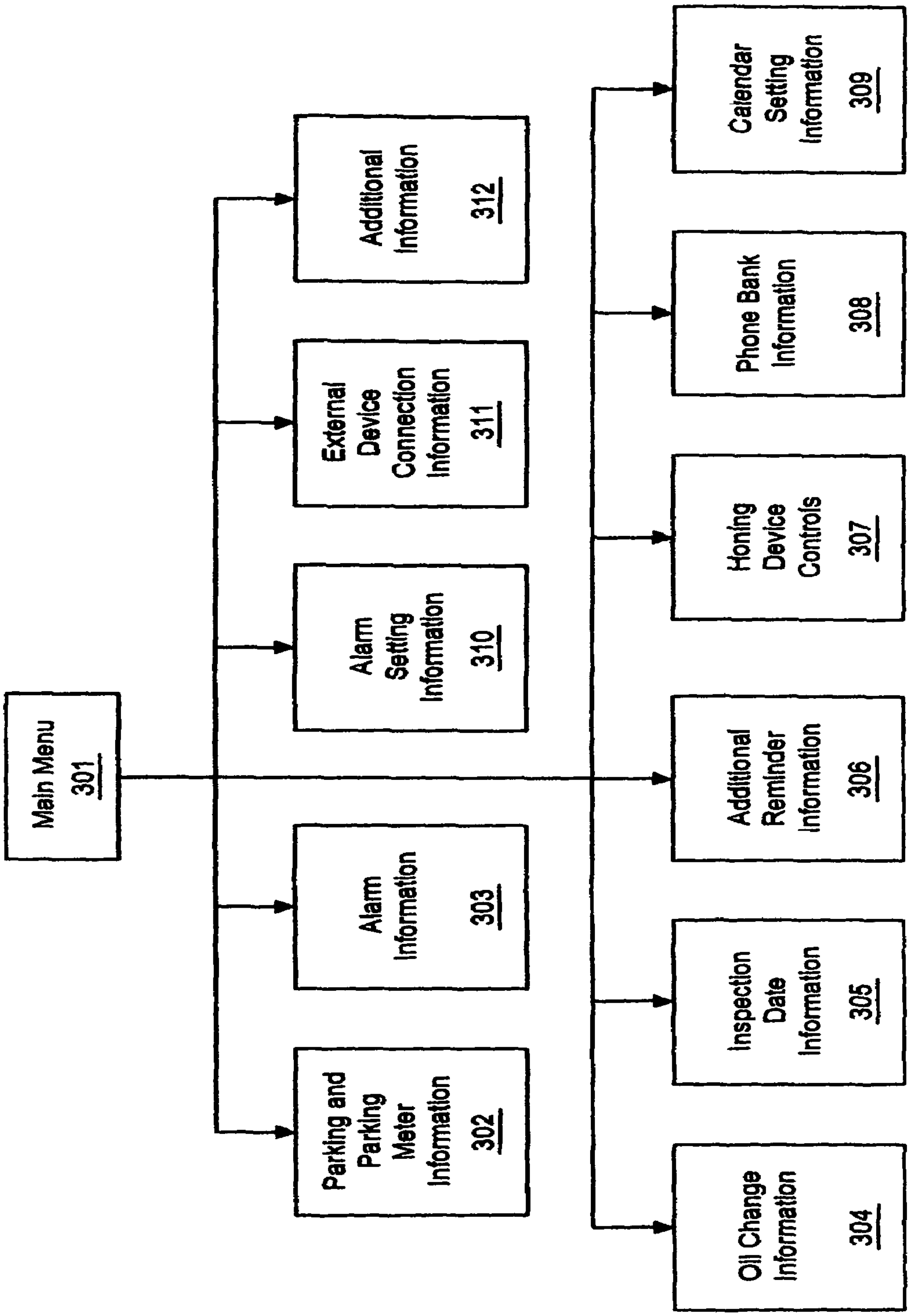
FIG. 3 shows an exemplary embodiment of several menu display sequences.
Figure 3B:
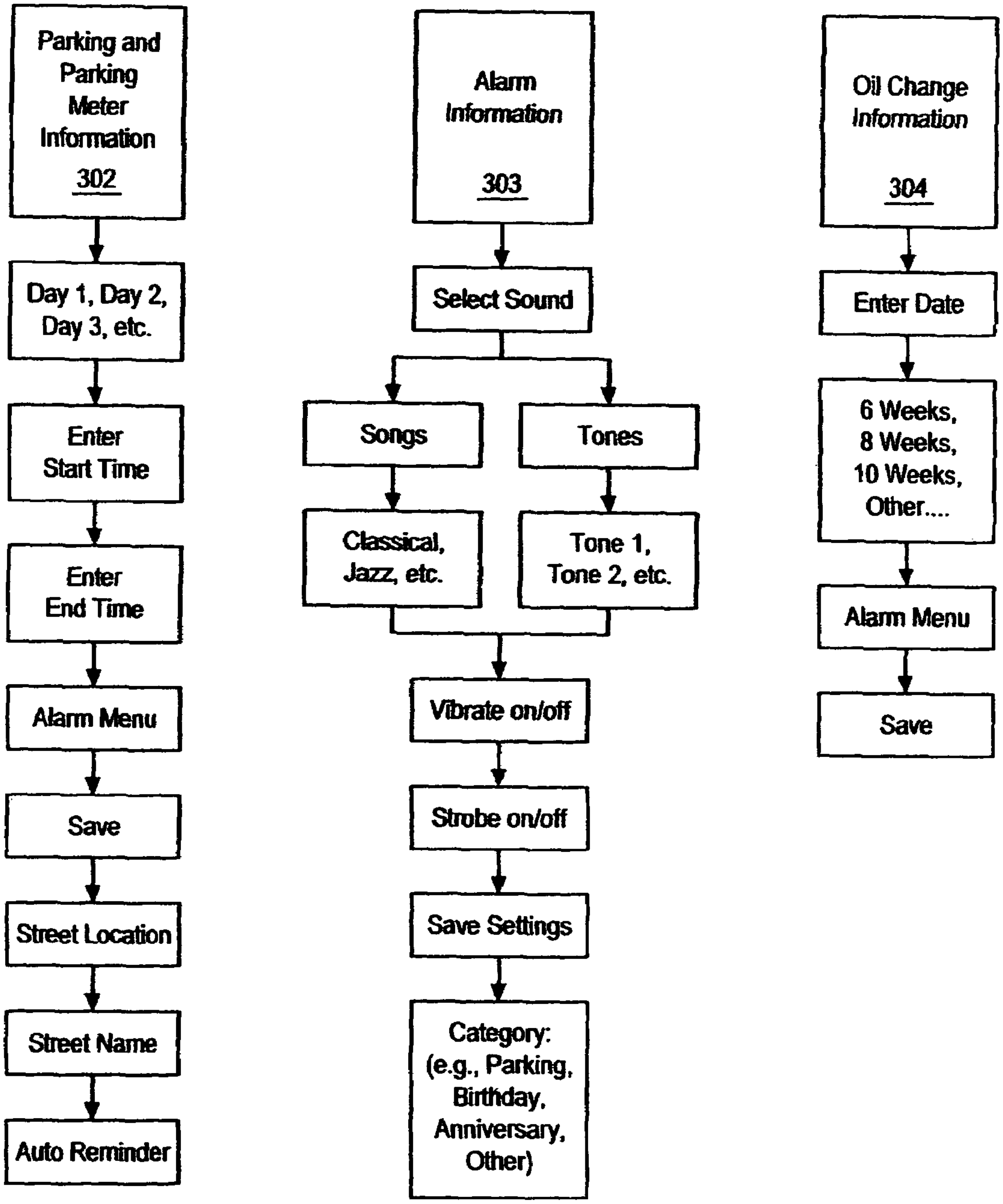
Figure 3C:
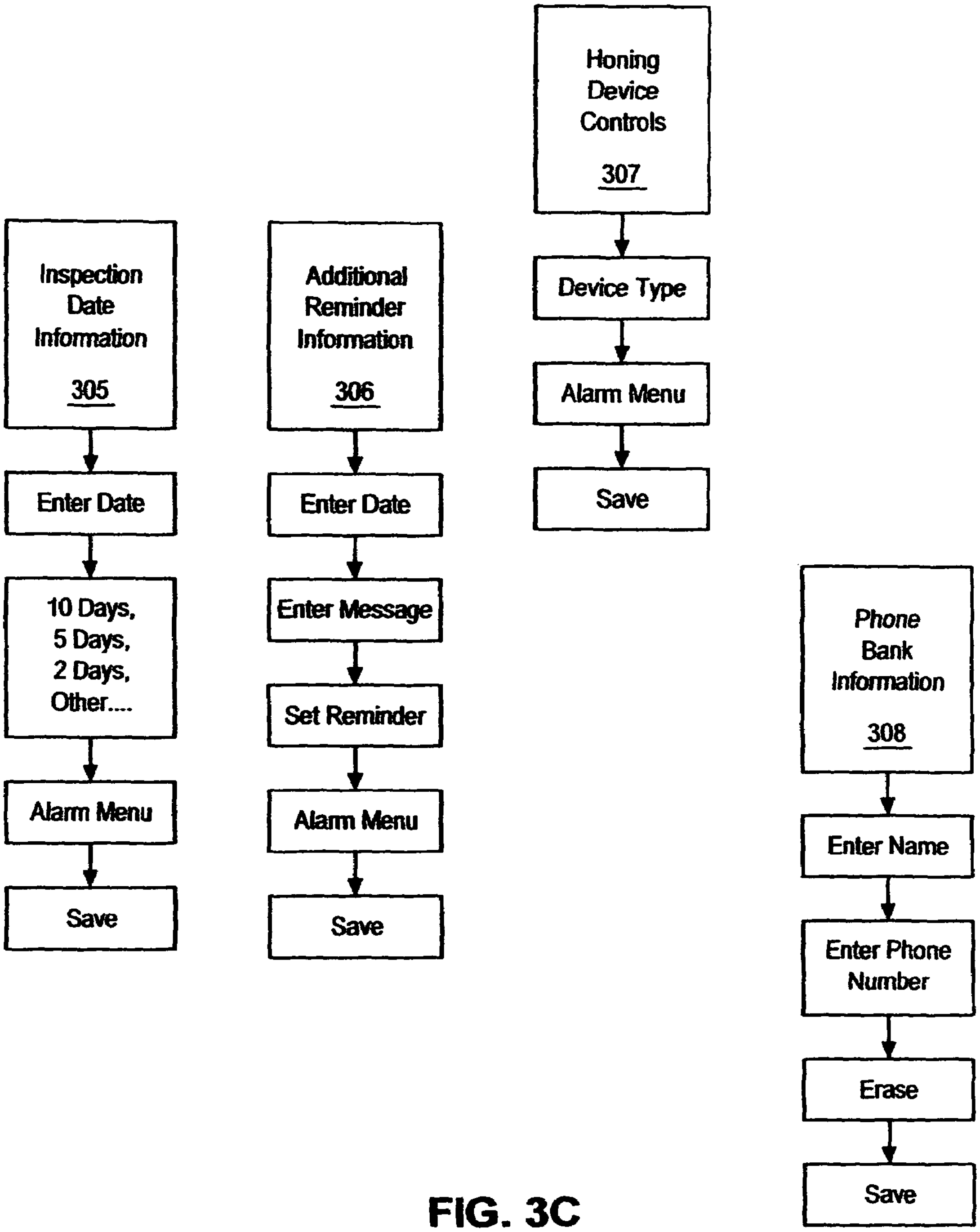
Figure 3D:
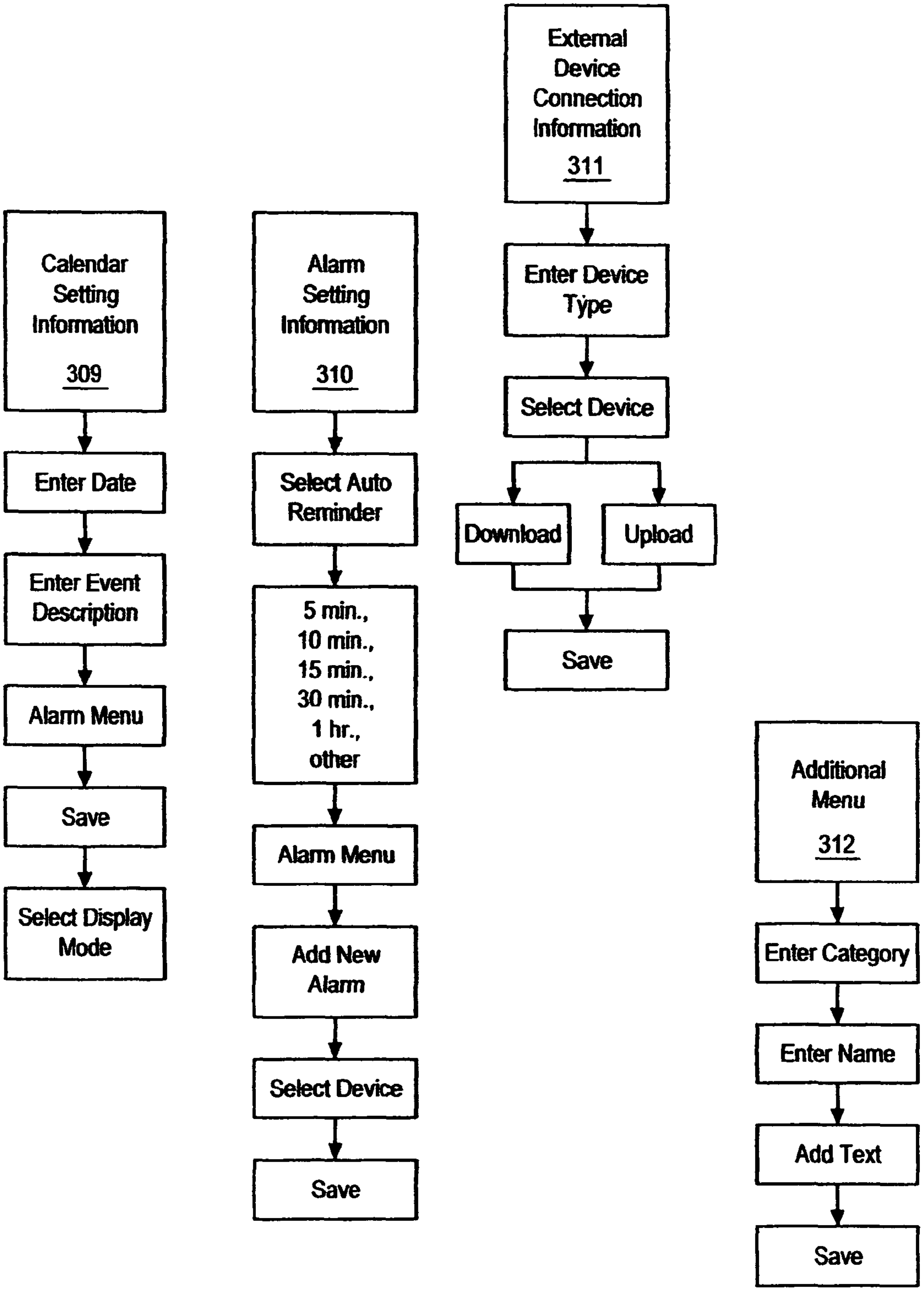

FIG. 2B shows the back of the exemplary embodiment of electronic timer device 200, shown in FIG. 2A. Outer housing 201 may include windows and cutouts 203 so that various components of inner housing 202, such as the light emitting device 205, may still be exposed when the inner housing 202 has been inserted into outer housing 201 in a closed position. A rechargeable battery 210 and an interface 212 where the electronic timer device 200 may be charged by the base unit are shown.

FIG. 3 shows an exemplary embodiment of several menu display sequences. These display sequences may be stored in the memory device of the electronic timer device. Menu 301 shows various information items, or other menus that may be accessed at this menu level including parking and parking meter information 302, alarm information 303, oil change information 304, inspection date information 305, additional reminder information 306, honing device controls 307, phone bank information 308, calendar setting information 309, alarm setting information 310 and external device connection information 311. The menus shown are exemplary, and other menu sequences and menu selections may be used.

When parking and parking meter information is selected, parking and parking meter information menu 302 is displayed in the display window. The selection within the parking and parking meter information menu 302 may be accessed by, for example, scrolling through the window display, pressing selected buttons to progress through the menu options, or pressing a toggle button to display the menu options according to successive presses. The parking and-parking meter information menu 302 allows the user to program the electronic timer device to store information regarding, for example, alternate side of the street parking, street names, dates and times. The days, and start and finish times may be entered by progressing through the menu options and an alarm type may also be selected from a menu of choices. Therefore, the user may be reminded of when to move the car to or from a parking space on a particular side of a particular street in accordance with alternate side of the street parking regulations, without the need to remember, thus the user may be able to avoid receiving a parking ticket.

The alarm menu 303 may be incorporated into the parking and parking meter information menu 302 sequence, or may be included in a separate sequence. The alarm menu 303 may allow the user to activate an alarm after an amount of time has passed, or when the clock time reaches a selected time. Therefore, when the user, for example, parks at a parking meter and inserts coins, which provide a certain amount of time to be displayed on the parking meter, the user may program the alarm to activate when the amount of time provided on the parking meter expires. The user may then select the type of alarm desired, for example, a sound, vibration and/or light sequence, according to the alarm settings. The electronic timer device may upon selection or automatically provide multiple alarm reminders to activate the alarm as the time approaches the alarm time set by the user, for example, when fifteen, ten, five, and, finally, zero minutes are left before activation of the alarm.

In addition, alarm menu 303 may allow the user to program reminders to be activated at other times and dates that are of significance to the user, for example birthdays, anniversaries, license or registration expiration or renewal dates, or reminders to pick up groceries, etc. The alarm menu 303 may allow, for example, up to fifty separate time and date entries to be stored, with various sound, vibration and/or light sequences to indicate the type of information. The alarm menu 303 may also allow the user to select from a choice of snooze or alarm delay capabilities.

The oil change information menu 304 may be used to program recurring reminders in accordance with a preferred schedule for changing oil. For example, the menu may provide a variety of time periods, one of which may be selected, for example, three months, such that an alarm or reminder is activated every three months, from an initial date, to indicate that the vehicle oil should be changed. Likewise, the inspection date information menu 305 may be used to program a date on which the last inspection occurred, and/or when a future inspection is scheduled and/or a time period between inspections, and may automatically provide an alarm or reminder before the next scheduled inspection date and time, for example ten days and five days before. An additional reminder information menu 306 may be provided to program additional reminder information.

The honing device control menu 307 may be used to set the sound pattern that will be activated when a honing function is selected. There may be several types of honing functions, for example, one honing function may allow a user to locate a misplaced electronic timer device by pressing a button on the base unit. A sound emitting device in the electronic timer device will emit a sound allowing the user to locate the electronic timer device. The honing device control menu 307 may also be used in conjunction with other system accessories. For example, a sound activated emergency door unlocking signal may be programmed into the electronic timer device. The emergency door unlocking signal would be emitted by the electronic timer device in response to a certain combination of sounds being emitted in the vicinity of the electronic timer device. Therefore, if the user, for example, locked the car keys attached to the electronic timer device in the car, the user may tap on the outside of the car window in a manner that imitates a predetermined sound pattern. When the electronic timer device detects this predetermined sound pattern, the emergency door unlocking signal may be emitted by the electronic timer device. The vehicle manufacturer or other automotive professional may install a unit connected to the electronic door lock system of the vehicle, which responds to the emergency door unlocking signal by causing the door locking system to unlock the door(s). This may be implemented such that it does not override the car alarm system, which may then be reset by the user in the manner proscribed by the vehicle manufacturer or alarm system manufacturer.

The electronic timer device may also include a phone bank information menu 308 used to store phone numbers. A predetermined number of entries, for example, fifty entries may be entered using the keypad, and stored in a database, where they may be accessed when the user desires.

A calendar setting information menu 309 may be used to store information regarding the day and date, as well as reminders to activate the alarm before or on a certain date. The calendar may include day/date information for, for example, a time period of fifty years.

The alarm setting information menu 310 may be used to select how often automatic alarm reminders are activated during a selected time period before an alarm is activated. For example, automatic reminders may be set to activate a reminder signal, for example, five minutes before an event that has been scheduled to activate an alarm at a predetermined time, or at several preset time intervals. The alarm setting information menu 310 may include a sequence allowing the user to select a portion of a familiar song as an alarm, for example, a classical, jazz, or popular music selection. The alarm setting information menu 310 may also include a sequence allowing the user to download additional music choices and store them in a database, which is accessible through this menu. The alarm setting information menu 310 may also include a menu sequence that allows the user to toggle between vibrate modes or deselect the vibrating function altogether.

Alarm setting information menu 310 may also be provided to select between sensory alarms, such as alarms to detect aromas, vibrations, or sounds.

External device connection information menu 311 may allow a user to initialize and use information downloaded from or uploaded to an external device such as the base unit or other compatible device. For example, a USB port may be controlled using this menu to receive additional alarm patterns, or songs, or additional software to update settings and functions of the electronic timer device.

Other additional information menus 312 may also be provided so that, for example, grocery lists, or personal notes may be entered.

Figure 4:
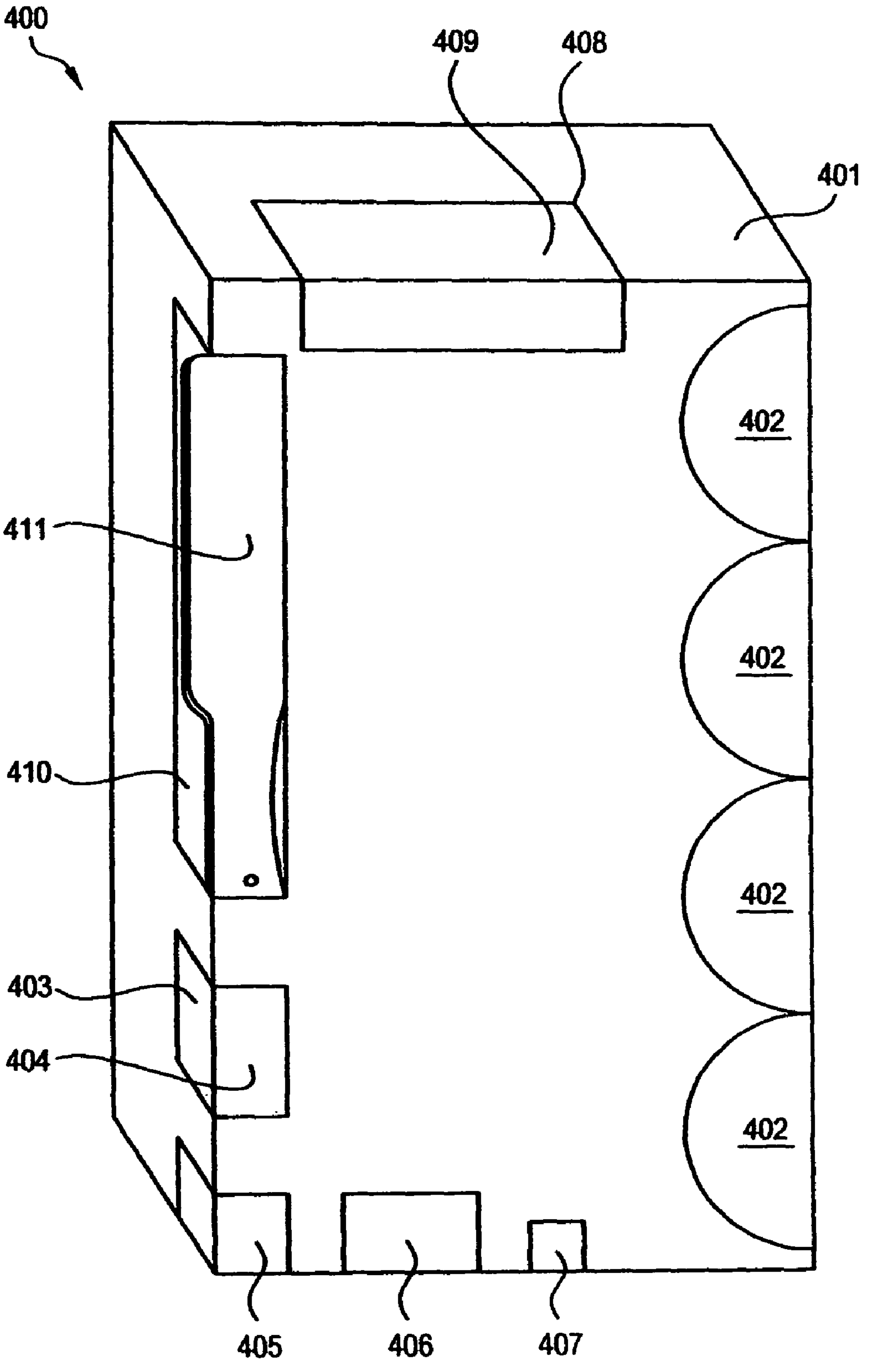
FIG. 4 shows another exemplary embodiment of an electronic timer device housing.

FIG. 4 shows another exemplary embodiment of an electronic timer device 400 having a housing 401. The housing 401 may include one or more quarter slots 402 in the form of grooves or indentations into which a quarter may be securely placed. A quarter slot 402 may be made to accommodate one quarter, several quarters, or other combinations of coin denominations or tokens.

Battery compartment 403 may accommodate a battery 404 and include a covering that may be opened in a hinged manner, or removed in order to access the battery 404. The battery 404 may be of any suitable type to provide the power necessary to operate the electronic timer device 400, including, for example, the light emitting device 405 and the sound emitting device 406. The battery 404 may be of a rechargeable variety, or may simply be replaced when necessary. The battery 404 may be recharged by connecting a charging device, such as a power cord, to the battery 404 using charging port 407, which may include a cover to protect the charging port when not in use. An automatic alarm may be activated in the electronic timer device 400 to indicate that the battery power is low, so that the user may change or recharge the battery 404 when necessary.

Memory card compartment 408 may be accommodate a memory card 409, which may store all the information so that any data entered will be stored even when the battery is discharged or removed. The memory card 409 may also include a microprocessor used to manage software used to run the electronic timer device 400 programs.

The external device connector compartment 410 may be configured as groove which will accommodate an arm attached at a hinged connecting point, so that the arm may swing into a closed position and an open position. The external device connector 411 may be, for example, a USB port connection device.

Figure 5:
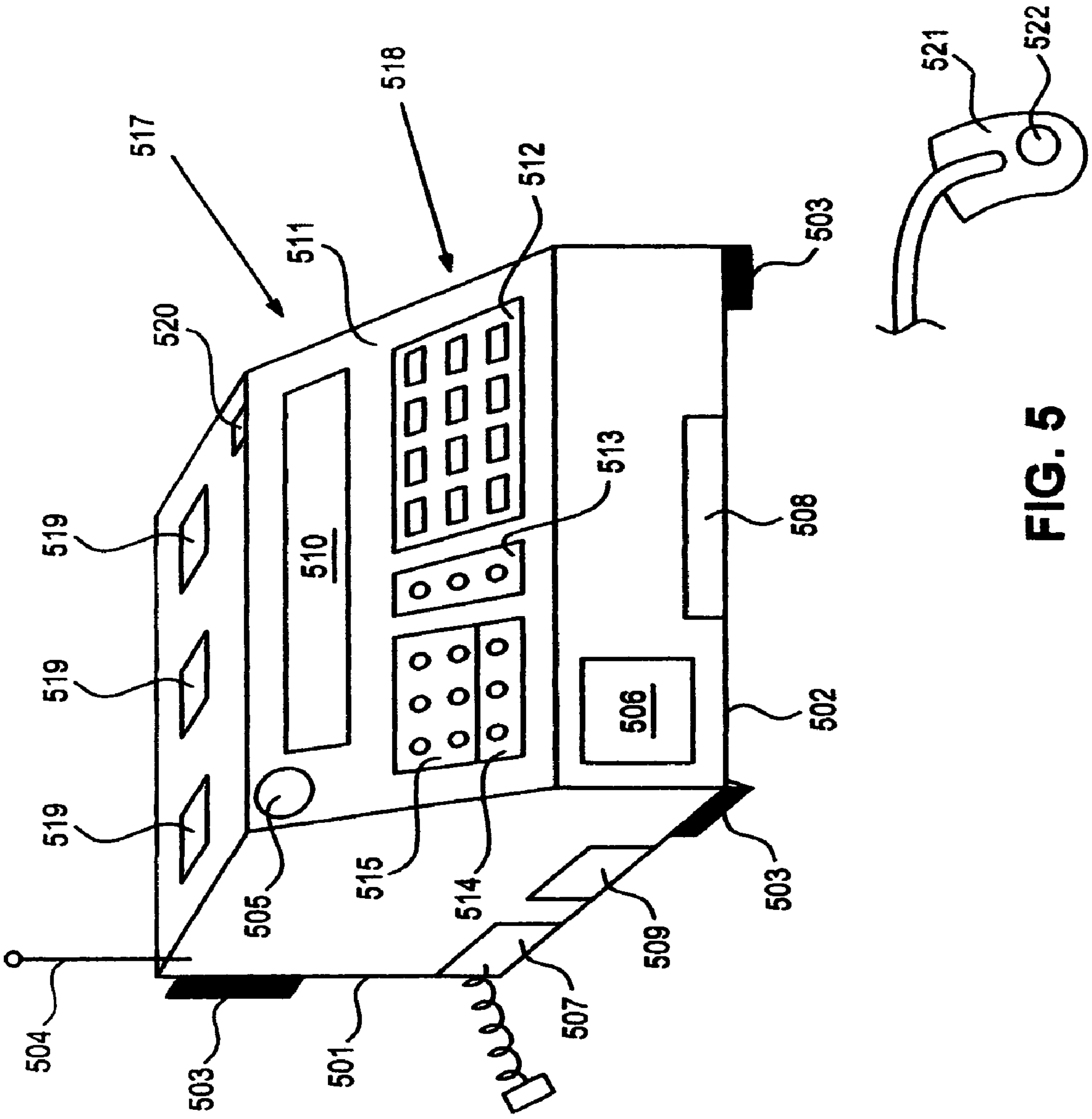
FIG. 5 shows an exemplary embodiment of an electronic timer device base unit.

FIG. 5 shows an exemplary embodiment of an electronic timer device base unit 501. The base unit 501 may be programmed simultaneously with the electronic timer device, or the devices may be synchronized at a later time if programming occurs separately. The housing 502 may include several attachments, such as a mounting attachment 503 so that it may be secured to a table top or a wall surface. An antenna 504 may be provided on the base unit 501 to allow the base unit 501 to transmit and receive information, for example, radio waves, to or from the electronic timer device, or another transmitter/receiver. The base unit 501 may also include a light emitting device 505, sound emitting device or speaker 506, external power source connection 507, battery compartment 508, and external device connection port 509.

The base unit 501 may also include a display 510 that may display menu information a similar manner to the electronic timer device. Additionally, the base unit 501 may include a keypad 511 with similar buttons to those included in the electronic timer device. The keypad 511 may have calculator buttons 512, mode selection buttons 513, and time/date selection buttons 514. The buttons may be provided so that they each perform multiple functions, so that the same button may enter a number into the display 510 when in a calculator mode and a letter into the display 510 when in a letter entry mode. Additionally, the button(s) may toggle between modes when pressed in a certain sequence, alone or in combination with another button. Shortcut buttons 515 may be provided, for example, a mode selector button and an electronic timer device honing button, to facilitate use of the keypad.

The base unit 501 may also include a memory card 517, and memory devices 518, such as a ROM, RAM, and/or EPROM, as well as a microprocessor to control these devices. The base unit 501 may, therefore, perform the same functions as the electronic timer device, and may be programmed in the same manner as the electronic timer device. Therefore, the same data entry options and menu sequences may be accessed using the base unit 501 that may be accessed using the electronic timer device. This data may be entered into both the electronic timer device and the base unit 501 at once, when the devices are coupled, or they may be periodically synchronized, automatically, or when the user initializes a synchronization.

The base unit 501 may also include rechargeable slots 519, where the electronic timer device may be placed in a manner such that the battery of the electronic timer device may be recharged. There may be several sets of rechargeable slots 519, so that more than one electronic timer device may be recharged at once. Electronic timer devices may be purchased in groups so that each user of the vehicle has an electronic timer device for his or her own personal use.

The base unit 501 may communicate with other accessories to the system. For example, a personal device honing button 520 may be provided. Personal device honing button 520 maybe used in conjunction with honing device 521 which is attachable to, for example, an eyeglass frame or other personal object. When the user presses honing device button 520, an audible or visual alarm device 522 is activated in honing device 521 so that the user may locate the object to which the honing device 521 is attached.

The base unit 501 may also include other features, such as a clock, and an alarm clock setting.

The base unit 501 and/or the electronic timer device 100 may be connectable, e.g., wirelessly, by radio signal, telephone signal, computer signal, etc., to a remote time server, e.g., an atomic time server or service, to automatically, e.g., selectively and/or periodically, set the date and/or time. The base unit 501 and/or the electronic timer device 100 may be configured to communicate with each other and/or with other devices via, e.g., a wireless communications link, e.g., BLUETOOTH, etc.

Figure 6:
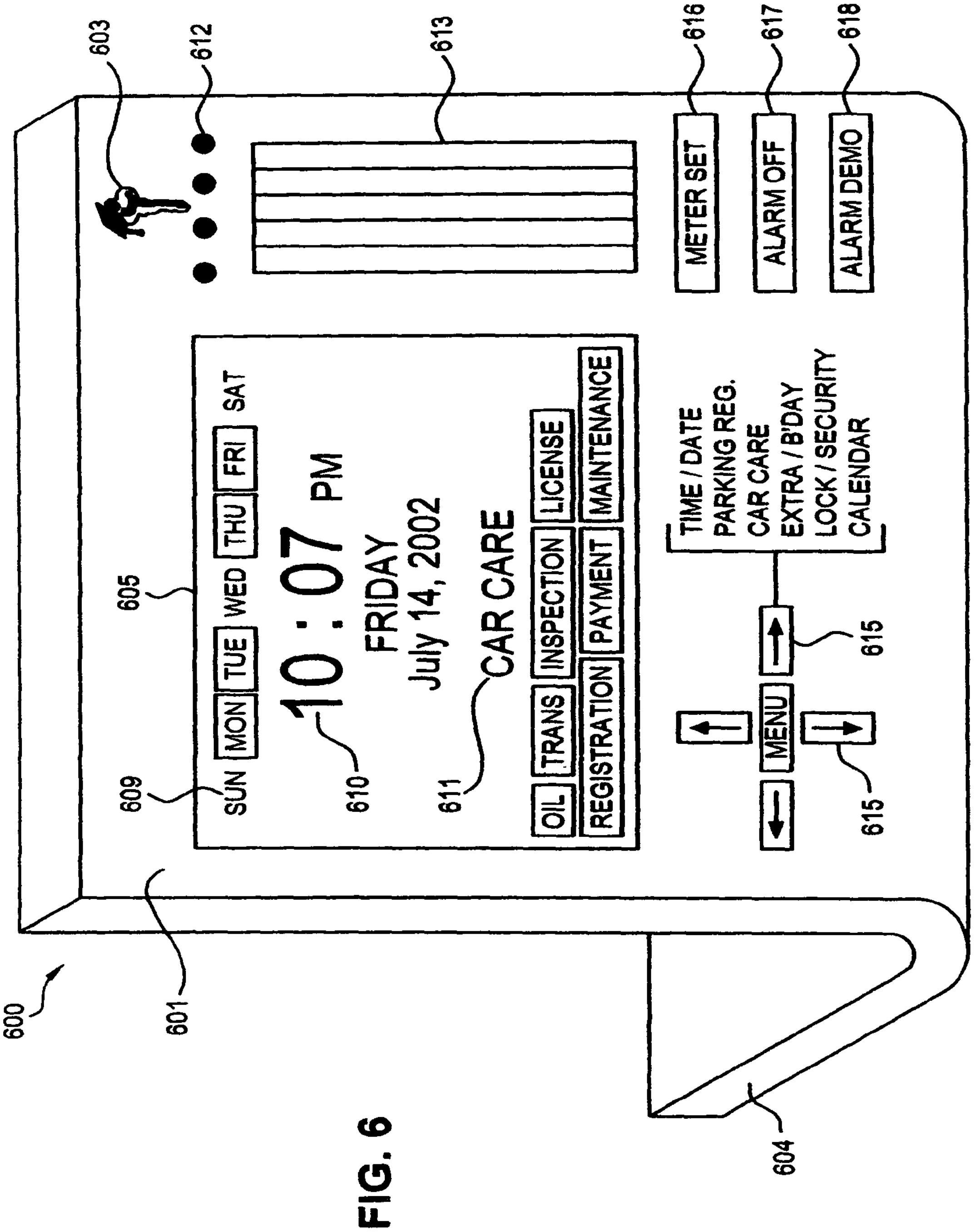
FIG. 6 shows another exemplary embodiment of an electronic timer device.

FIG. 6 shows another example embodiment of an electronic timer device. The housing 600 may be formed with two section connected by, for example, a friction hinge, such that a bottom section 604 lays flat and supports a top section 601, which is positioned upright. Alternatively, the housing may be made of a sturdy but flexible material, which will stay fixed after being positioned. Section 601 may include decorative features 603 such as words or drawings to identify the electronic timer device.

A display surface 605 may display include an numbers and letters and include mechanical virtual or touch screen buttons 607, or conventional buttons may be in the vicinity of the display surface. The display 605 may include several sections to display information. For example display section 609 may display the days of the week, with special markings or colors to indicate which days are associated with an alarm setting. Display section 610 may show the time, day and date for easy reference. Display section 611 may display buttons related to car care, such as buttons to set reminders regarding oil changes, transmission maintenance, license and registration renewal, car related payments, and other maintenance reminders.

Section 601 also includes light emitting devices 612 and speaker 613 to emit light and/or sound in response to setting changes and alarm settings. A menu button and menu arrows 615 may be used to navigate the electronic timer device menus and other buttons are provided such as meter set button 616, alarm off button 617, and alarm demo button 618.

The electronic timer device may include a microphone for recording, e.g., a personal alarm, message, etc., to be played, for example, on a regularly scheduled basis, at a set date and time, etc.

Figure 7:
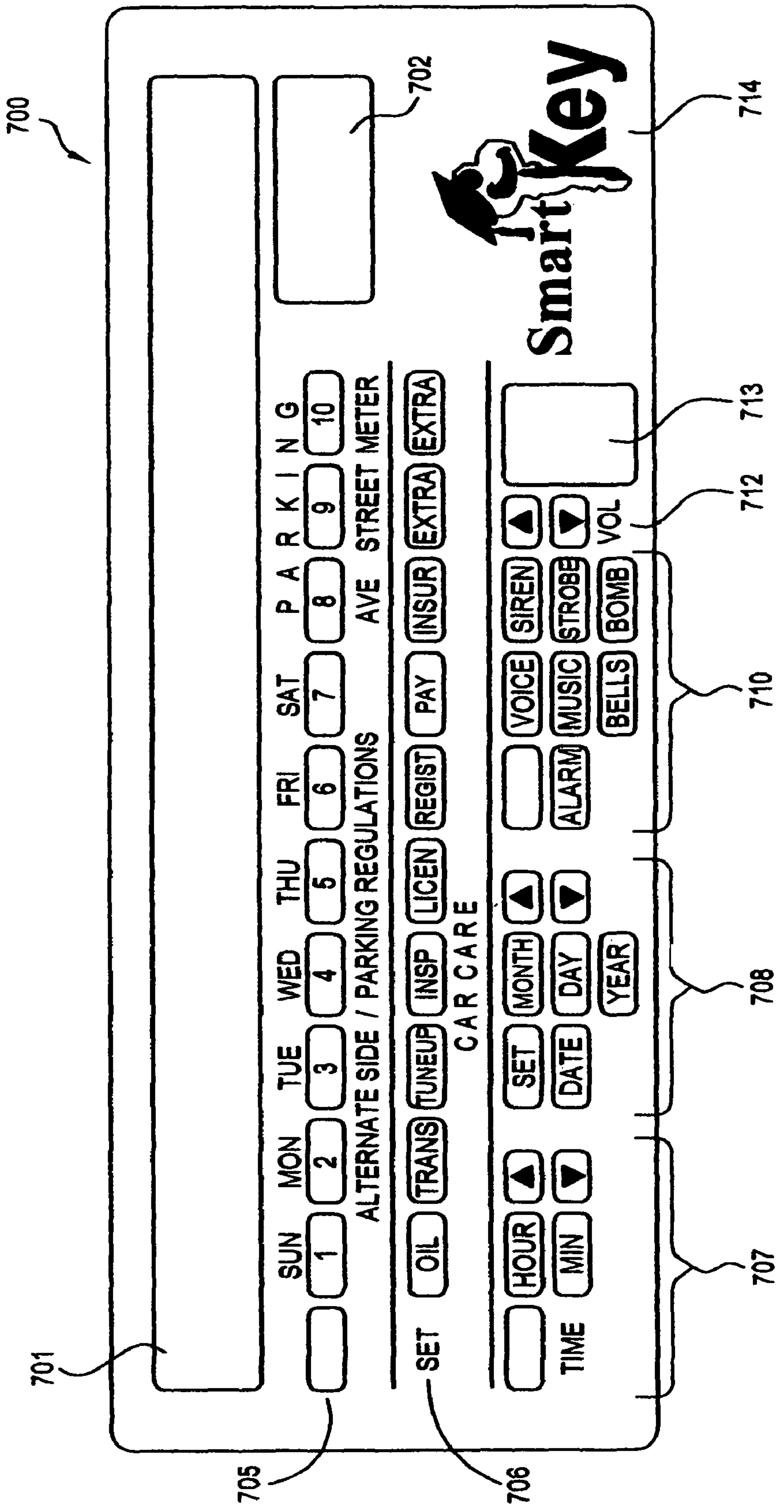
FIG. 7 shows another exemplary embodiment of an electronic timer device.

FIG. 7 shows an exemplary embodiment of an electronic timer device. Housing 700 includes a light emitting device 702 and scrolling electronic display 701, which scrolls menu information and messages. For example, when an alarm is activated a message may be displayed in scrolling electronic display 701 with instructions related to that alarm. Row 705 of buttons includes a set button and buttons used for entering alternate side of the street parking information. Row 706 of buttons includes a set button and buttons used for entering information regarding vehicle maintenance. Time set buttons 707 with a set button, buttons for entering the hour and minute, and up and down arrow buttons, as well as date set buttons 708 with a set button, buttons for entering the month, day and year, and up and down arrow buttons are also shown. Alarm set buttons 710 including an off button, buttons to select various alarm choices, such as, voice, music, bell, siren, and strobe are also shown, as well as volume set buttons 712 and a speaker 713. A decorative design is shown. at 714.

Instead of entering data relating to a selected parking location at which a vehicle is to be parked into the electronic timer device to access stored information relating to the parking regulations associated with the selected parking location, the electronic timer device can have means for accessing a positioning system (e.g., GPS) to determine the location of the vehicle and the selected parking location and the stored data relating to the parking regulations associated with the selected parking location can be accessed in response to the vehicle location determination made from the positioning system. For example, the electronic timer device 200 of FIG. 2B can include an antenna 206 and a transmitter/receiver unit 207, generally similar to ones installed in vehicles at the present time, for communicating with a global positioning system (GPS) 208. After the location of the vehicle and the selected parking have been determined, the accessed data relating to the parking regulations associated with the selected parking location can be processed to determine if parking the vehicle at the selected parking location for the period of time that the vehicle is to be parked at the selected parking location is permitted and when the period of time that the vehicle is permitted to be parked at the selected parking location will expire.

Instead of storing data relating to the parking regulations associated with the parking location at which a vehicle is to be parked in the electronic timer device, the data relating to the parking regulations can be stored at a remote location that is accessed by the electronic timer device when a selected parking location at which a vehicle is to be parked is entered in the electronic timer device, along with entry of the day of the week that the vehicle is to be parked at the selected parking location, the time of the day that the vehicle is to be parked at the selected parking location, and the period of time that the vehicle is to be parked at the selected parking location. FIG. 1A shows the electronic timer device 100 having an antenna 108 that allows the electronic timer device, having a conventional transmitter/receiver, to transmit to a transmitter/receiver 109 at a remote location signals that access a data base at the remote location for the parking regulations associated with the parking location at which a vehicle is to be parked and to receive the accessed information transmitted from the remote location. Then the entered data relating to the day of the week, the time of the day, and the period of time that the vehicle is to be parked at the selected parking location is processed with the accessed data relating to the parking regulations associated with the selected parking location to determine if parking a vehicle at the selected parking location for the period of time that a vehicle is to be parked at the selected parking location is permitted; and when the period of time that a vehicle is permitted to be parked at the selected parking location will expire.

Rather than entering into the electronic timer device data relating to a selected parking location and the day of the week and the time of the day that the vehicle is to be parked at the selected parking location, the electronic timer device can include both a calendar/clock that continuously provides data relating to the day of the week and the time of the day and, as indicated above, means for accessing a positioning system (e.g., GPS) to determine the location of the vehicle and the selected parking location at which the vehicle is being parked. The data relating to the parking regulations associated with the selected parking location stored at the remote location can be accessed in response to the vehicle location determination made from the positioning system and the accessed data relating to the parking regulations associated with the selected parking location then can be processed with the data relating to the day of the week and the time of the day provided by the calendar/clock and the entered data relating the period of time that the vehicle is to be parked at the selected parking location to determine if parking the vehicle at the selected parking location is permitted and when the period of time that the vehicle is permitted to be parked at the selected parking location will expire.

As illustrated in FIG. 1A, electronic timer device 100 can include a sonar transducer 111 for transmitting signals from a first point, such as a fire hydrant, to a target at a second point, such as an end of a vehicle, and for receiving reflections from the target. Conventional circuitry, in the electronic timer device, is the source of the transmitted signals and serves to process the reflections to determine the distance between the first point and the target. Data representative of the distance determination is entered in the electronic timer device and processed against a relevant parking regulation, such as the minimum distance that a vehicle must be spaced from a fire hydrant, in the same manner that other entered data is processed against relevant parking regulations to determine if parking the vehicle at the selected parking location is permitted.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A vehicle parking assistance electronic timer system comprising:

data storage means for storing sets of data relating to:

(a) parking locations at which a vehicle is to be parked, and (b) predetermined parking regulations, individually associated with the parking locations, that govern at least one of:

(1) the days of the week and the times of the day during which the parking of vehicles is permitted at the associated parking locations, and (2) the days of the week and the times of the day during which the parking of vehicles is not permitted at the associated parking locations;

data entry means for entering data relating to:

(a) a selected one of the stored parking locations, (b) the day of the week that a vehicle is to be parked at the selected parking location, (c) the time of the day that a vehicle is to be parked at the selected parking location, and (d) the period of time that a vehicle is to be parked at the selected parking location;

means for:

(a) accessing from the data storage means, in response to the entered data relating to the selected parking location, the stored data relating to the parking regulations associated with the selected parking location, and (b) processing:

(1) the entered data relating to the day of the week that a vehicle is to be parked at the selected parking location, (2) the entered data relating to the time of the day that a vehicle is to be parked at the selected parking location, and (3) the entered data relating to the period of time that a vehicle is to be parked at the selected parking location with the accessed data relating to the parking regulations associated with the selected parking location to determine:

(1) if parking a vehicle at the selected parking location for the period of time that a vehicle is to be parked at the selected parking location is permitted, and (2) when the period of time that a vehicle is permitted to be parked at the selected parking location will expire; and display means for displaying information relating to at least one of:

(a) a selected one of the stored parking locations, (b) the day of the week that a vehicle is to be parked at the selected parking location, (c) the time of the day that a vehicle is to be parked at the selected parking location, (d) the period of time that a vehicle is to be parked at the selected parking location, and (e) the parking regulations associated with the selected location.

2. A vehicle parking assistance electronic timer system according to claim 1 further including:

(a) a transmitter/receiver for:

(1) receiving signals transmitted from a remote location to control the entry of data by the data entry means, and (2) transmitting signals to the remote location to notify a user that the permitted parking will expire in a predetermined period of time, and (b) a remote controller for:

(1) transmitting the signals from the remote location that control the entry of data by the data entry means, and (2) receiving the signals at the remote location that notify a user that the permitted parking will expire in a predetermined period of time.

3. A method of determining that the parking of a vehicle at a selected parking location at a selected time is permitted, the method comprising the steps of:

providing a vehicle parking assistance unit having:
(a) data storage means,
(b) data entry means, and
(c) display means;
storing in the data storage means sets of data relating to:
(a) parking locations at which a vehicle is to be parked, and
(b) predetermined parking regulations, individually associated with the parking locations, that govern at least one of
(1) the days of the week and the times of the day during which the parking of vehicles is permitted at the associated parking locations, and
(2) the days of the week and the times of the day during which the parking of vehicles is not permitted at the associated parking locations;
entering in the data entry means data relating to:
(a) a selected one of the stored parking locations,
(b) the day of the week that a vehicle is to be parked at the selected parking location,
(c) the time of the day that a vehicle is to be parked at the selected parking location, and
(d) the period of time that a vehicle is to be parked at the selected parking location;
accessing from the data storage means, in response to the entered data relating to the selected parking location, the stored data relating to the parking regulations associated with the selected parking location;
processing:
(a) the entered data relating to the day of the week that a vehicle is to be parked at the selected parking location,
(b) the entered data relating to the time of the day that a vehicle is to be parked at the selected parking location, and
(c) the entered data relating to the period of time that a vehicle is to be parked at the selected parking location
with the accessed data relating to the parking regulations associated with the selected parking location to determine:
(a) if parking a vehicle at the selected parking location for the period of time that a vehicle is to be parked at the selected parking location is permitted, and
(b) when the period of time that a vehicle is permitted to be parked at the selected parking location will expire; and
displaying information relating to at least one of:
(a) a selected one of the stored parking locations,
(b) the day of the week that a vehicle is to be parked at the selected parking location,
(c) the time of the day that a vehicle is to be parked at the selected parking location,
(d) the period of time that a vehicle is to be parked at the selected parking location; and
(e) the parking regulations associated with the selected location.

4. A vehicle parking assistance electronic timer system comprising:
data storage means for storing sets of data relating to:
(a) parking locations at which a vehicle is to be parked, and
(b) predetermined parking regulations, individually associated with the parking locations, that govern at least one of:
(1) the days of the week and the times of the day during which the parking of vehicles is permitted at the associated parking locations,
(2) the days of the week and the times of the day during which the parking of vehicles is not permitted at the associated parking locations,
(3) the types of vehicles permitted to park at the associated parking locations, and
(4) the types of vehicles not permitted to park at the associated parking locations;
data entry means for entering data relating to:
(a) a selected one of the stored parking locations,
(b) the day of the week that a vehicle is to be parked at the selected parking location,
(c) the time of the day that a vehicle is to be parked at the selected parking location, and
(d) the period of time that a vehicle is to be parked at the selected parking location; and
means for:
(a) accessing from the data storage means, in response to the entered data relating to the selected parking location, the stored data relating to the parking regulations associated with the selected parking location, and
(b) processing:
(1) the entered data relating to the day of the week that a vehicle is to be parked at the selected parking location,
(2) the entered data relating to the time of the day that a vehicle is to be parked at the selected parking location, and
(3) the entered data relating to the period of time that a vehicle is to be parked at the selected parking location
with the accessed data relating to the parking regulations associated with the selected parking location to determine:
(1) if parking a vehicle at the selected parking location for the period of time that a vehicle is to be parked at the selected parking location is permitted, and
(2) when the period of time that a vehicle is permitted to be parked at the selected parking location will expire.

5. A vehicle parking assistance electronic timer system comprising:
data storage means for storing sets of data relating to:
(a) parking locations at which a vehicle is to be parked, and
(b) predetermined parking regulations, individually associated with the parking locations, that govern at least one of:
(1) the days of the week and the times of the day during which the parking of vehicles is permitted at the associated parking locations, and
(2) the days of the week and the times of the day during which the parking of vehicles is not permitted at the associated parking locations;
data entry means for entering data relating to:
(a) a selected one of the stored parking locations,
(b) the day of the week that a vehicle is to be parked at the selected parking location, and
(c) the time of the day that a vehicle is to be parked at the selected parking location;
means for:
(a) accessing from the data storage means, in response to the entered data relating to the selected parking location, the stored data relating to the parking regulations associated with the selected parking location, and
(b) processing:
(1) the entered data relating to the day of the week that a vehicle is to be parked at the selected parking location,
(2) the entered data relating to the time of the day that a vehicle is to be parked at the selected parking location, and
(3) the entered data relating to the period of time that a vehicle is to be parked at the selected parking location with the accessed data relating to the parking regulations associated with the selected parking location to determine:

(1) if parking a vehicle at the selected parking location for the period of time that a vehicle is to be parked at the selected parking location is permitted, and (2) when the period of time that a vehicle is permitted to be parked at the selected parking location will expire; and display means for displaying information relating to at least one of:

(a) a selected one of the stored parking locations, (b) the day of the week that a vehicle is to be parked at the selected parking location, (c) the time of the day that a vehicle is to be parked at the selected parking location, and (d) the parking regulations associated with the selected location.

6. A vehicle parking assistance electronic timer system comprising:

data storage means for storing sets of data relating to:

(a) parking locations at which a vehicle is to be parked, and (b) predetermined parking regulations, individually associated with the parking locations, that govern at least one of:

(1) the days of the week and the times of the day during which the parking of vehicles is permitted at the associated parking locations, and (2) the days of the week and the times of the day during which the parking of vehicles is not permitted at the associated parking locations;

vehicle locating means for determining, from a positioning system, the location of a vehicle and the selected parking location at which the vehicle is being parked;

means responsive to the vehicle locating means for:

(a) accessing from the data storage means stored data relating to the parking regulations associated with the selected parking location, and (b) processing the accessed data relating to the parking regulations associated with the selected parking location to determine:

(1) if parking a vehicle at the selected parking location for the period of time that a vehicle is to be parked at the selected parking location is permitted, and (2) when the period of time that a vehicle is permitted to be parked at the selected parking location will expire; and display means for displaying information relating to at least one of:

(a) a selected one of the stored parking locations, (b) the day of the week that a vehicle is to be parked at the selected parking location, (c) the time of the day that a vehicle is to be parked at the selected parking location, (d) the period of time that a vehicle is to be parked at the selected parking location, and (e) the parking regulations associated with the selected location.

7. A vehicle parking assistance electronic timer system comprising:

data entry means for entering data relating to:

(a) a selected parking location at which a vehicle is to be parked, (b) the day of the week that a vehicle is to be parked at the selected parking location, (c) the time of the day that a vehicle is to be parked at the selected parking location, and (d) the period of time that a vehicle is to be parked at the selected parking location;

means responsive to the entered data relating to a selected parking location at which a vehicle is to be parked for accessing, from a remotely located storage having stored sets of data relating to:

(a) parking locations at which a vehicle is to be parked, and (b) predetermined parking regulations, individually associated with the parking locations, that govern at least one of:

(1) the days of the week and the times of the day during which the parking of vehicles is permitted at the associated parking locations, and (2) the days of the week and the times of the day during which the parking of vehicles is not permitted at the associated parking regulations, data relating to the parking regulations of the selected parking location; and means responsive to:

(a) the entered data relating to the day of the week that a vehicle is to be parked at the selected parking location, (b) the entered data relating to the time of the day that a vehicle is to be parked at the selected parking location, (c) the entered data relating to the period of time that a vehicle is to be parked at the selected parking location, and (d) the accessed data relating to the parking regulations of the selected parking location for processing the entered data with the accessed data to determine:

(a) if parking a vehicle at the selected parking location for the period of time that a vehicle is to be parked at the selected parking location is permitted and (b) when the period of time that a vehicle is permitted to be parked at the selected parking location will expire.

8. A vehicle parking assistance electronic timer system according to claim 7 further including display means for displaying information relating to at least one of:

(a) a selected one of the stored parking locations, (b) the day of the week that a vehicle is to be parked at the selected parking location, (c) the time of the day that a vehicle is to be parked at the selected parking location, (d) the period of time that a vehicle is to be parked at the selected parking location, and (e) the parking regulations associated with the selected location.

9. A vehicle parking assistance electronic timer system according to claim 1 further including means for measuring a distance and:

(a) said data entry means enter data relating to the measured distance, (b) said data storage means store data relating to parking regulations having distance as a factor, and (c) said accessing and processing means:

(1) access from the data storage means, in response to the entered data relating to the measured distance, the stored data relating to the parking regulations having distance as a factor, and (2) process the entered data relating to the measured distance with the accessed data relating to the parking regulations having distance as a factor to determine if parking a vehicle at the selected parking location is permitted.

10. A vehicle parking assistance electronic timer system comprising:

data storage means for storing sets of data relating to:

(a) parking locations at which a vehicle is to be parked, and (b) predetermined parking regulations, individually associated with the parking locations, that govern at least one of:

(1) the days of the week and the times of the day during which the parking of vehicles is permitted at the associated parking locations, and (2) the days of the week and the times of the day during which the parking of vehicles is not permitted at the associated parking locations;

data entry means for entering data relating to:

(a) a selected one of the stored parking locations, (b) the day of the week that a vehicle is to be parked at the selected parking location, (c) the time of the day that a vehicle is to be parked at the selected parking location, and (d) the period of time that a vehicle is to be parked at the selected parking location; and means for:

(a) accessing from the data storage means, in response to the entered data relating to the selected parking location, the stored data relating to the parking regulations associated with the selected parking location, and (b) processing:

(1) the entered data relating to the day of the week that a vehicle is to be parked at the selected parking location, (2) the entered data relating to the time of the day that a vehicle is to be parked at the selected parking location, and (3) the entered data relating to the period of time that a vehicle is to be parked at the selected parking location with the accessed data relating to the parking regulations associated with the selected parking location to determine:

(1) if parking a vehicle at the selected parking location for the period of time that a vehicle is to be parked at the selected parking location is permitted, and (2) when the period of time that a vehicle is permitted to be parked at the selected parking location will expire.

11. A vehicle parking assistance electronic timer system according to claim 10 further including:

(a) a transmitter/receiver for:

(1) receiving signals transmitted from a remote location to control the entry of data by the data entry means, and (2) transmitting signals to the remote location to notify a user that the permitted parking will expire in a predetermined period of time, and (b) a remote controller for:

(1) transmitting the signals from the remote location that control the entry of data by the data entry means, and (2) receiving the signals at the remote location that notify a user that the permitted parking will expire in a predetermined period of time.

12. A vehicle parking assistance electronic timer system comprising:

vehicle locating means for determining, from a positioning system, the location of a vehicle and a selected parking location at which the vehicle is being parked;

means responsive to said vehicle locating means for:

(a) accessing, from a remotely located storage having stored sets of data relating to:

(1) parking locations at which a vehicle is to be parked, and (2) predetermining parking regulations, individually associated with the parking locations that govern at least one of:

(i) the days of the week and the times of the day during which the parking of vehicles is permitted at the associated parking locations, and (ii) the days of the week and the times of the day during which the parking of vehicles is not permitted at the associated parking regulations, data relating to the parking regulations of the selected parking location; and (b) processing the data relating to the determined vehicle location with the accessed data to determine:

(1) if parking a vehicle at the selected parking location for the period of time that a vehicle is to be parked at the selected parking location is permitted and (2) when the period of time that a vehicle is permitted to be parked at the selected parking location will expire.

* * * * *